J. M. SPITZGLASS.
FLOW METER.
APPLICATION FILED MAY 19, 1915.
1,325,763.
Patented Dec. 23, 1919.
2 SHEETS—SHEET 1.
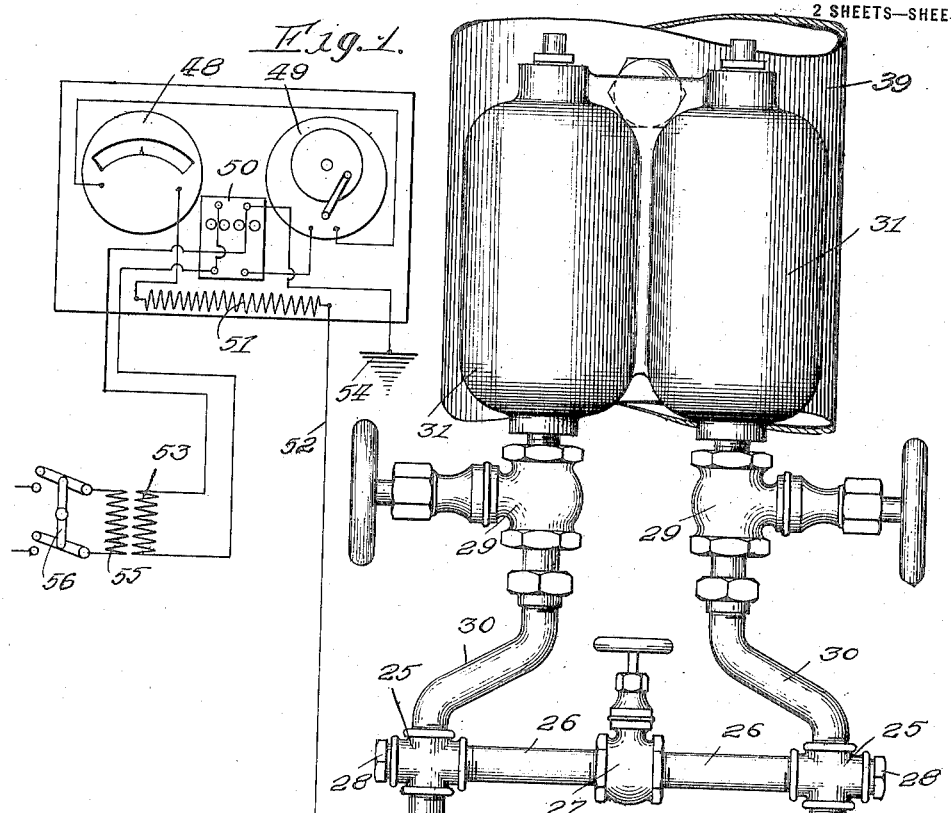
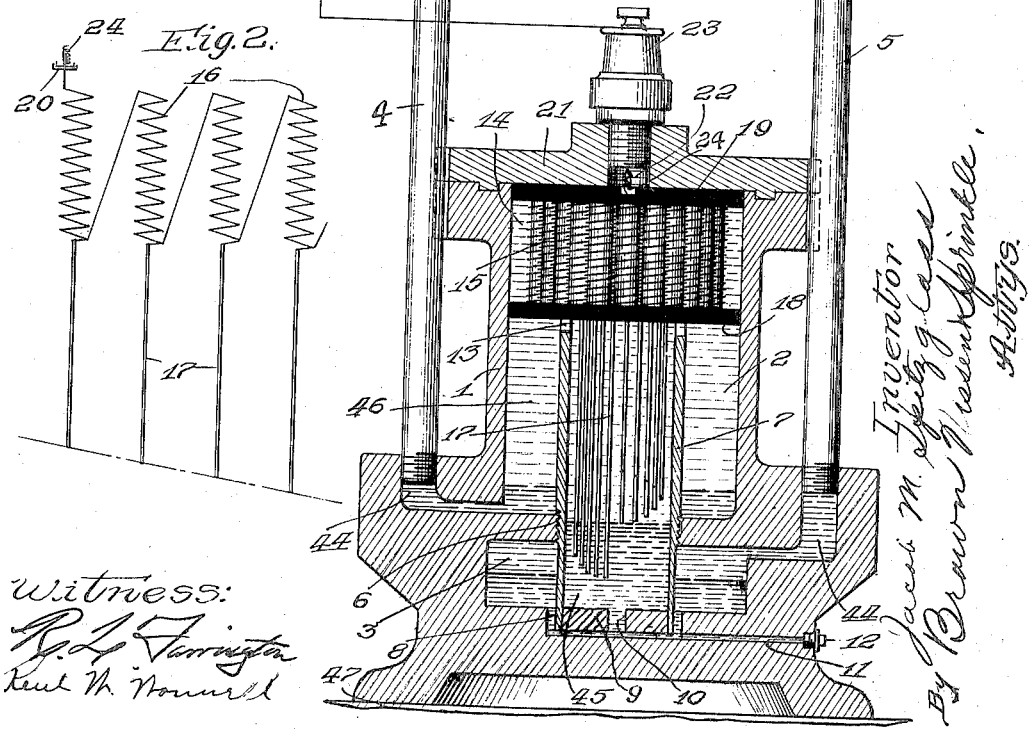
Witness:
R. L. Farrington
Kent M. Nowell
Inventor
Jacob M. Spitzglass
By Brown Wisenbrinkle
Attys.

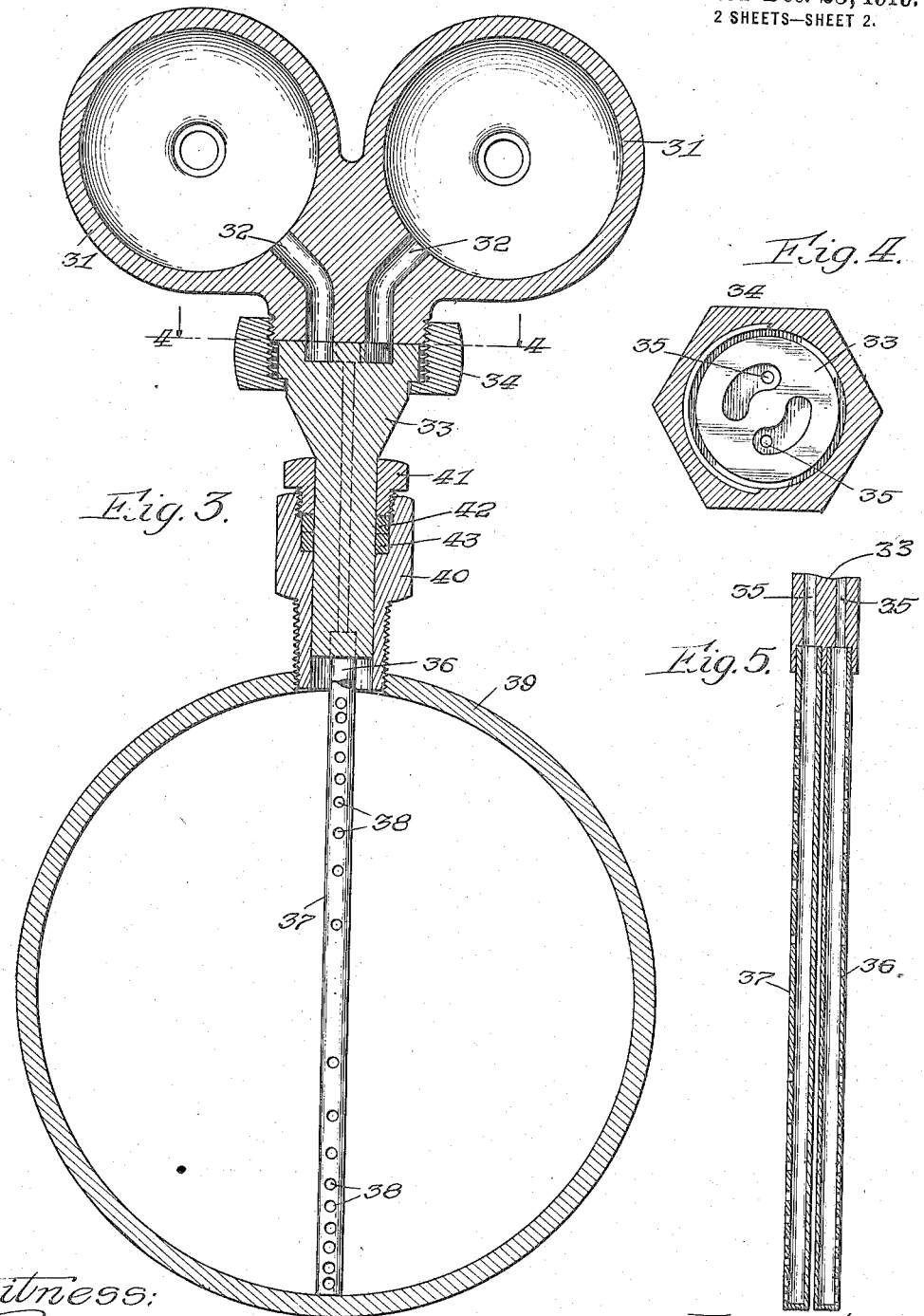

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

FLOW-METER.

1,325,763.  Specification of Letters Patent.  Patented Dec. 23, 1919.

Application filed May 19, 1915. Serial No. 29,063.

*To all whom it may concern:*

Be it known that I, JACOB M. SPITZGLASS, a citizen of the United States, residing at Chicago, in the county of Cook and State of Illinois, have invented certain new and useful Improvements in Flow-Meters, of which the following is a specification.

This invention relates to inferential fluid meters depending in their action upon the pressure difference created by the flow of fluid in a given conduit and transmitted by suitable means, the pressure difference being a function of the flow and proportional to the square of the velocity of the given fluid.

It is the object of this device to provide accurate and convenient means whereby the pressure difference balanced by a liquid column in a U-tube is made to actuate an ammeter and watt meter, to indicate or register on their corresponding dials a continuous amount of electrical energy directly proportional to the velocity of the fluid, or to the volume of fluid passing through the conduit.

Other objects will appear hereinafter.

In the accompanying drawings, Figure 1 is a view, partly in section, of a flow meter constructed in accordance with the principles of this invention applied to a vertical pipe and having electrical indicating and recording mechanism in connection therewith; Fig. 2 is a diagrammatic view showing the electrical contacts and connections; Fig. 3 is a sectional view of the Pitot tube connection with the steam pipe; Fig. 4 is a sectional view taken on the line 4—4 of Fig. 3; and Fig. 5 is a sectional view showing the static and dynamic tubes of the Pitot tube.

A suitable apparatus for accomplishing the results sought is illustrated by the drawings, in Fig. 1 of which the numeral 1 designates generally a casing in which there is an upper chamber 2 and a lower chamber 3 having communication with pipes 4 and 5 respectively. A threaded aperture 6 is formed in the casing between the two chambers, and in this aperture a shell 7 is secured which extends from the bottom of the lower chamber and upwardly in the upper chamber 2. The lower portion of the casing is formed with passages 8 forming communication between the lower chamber 3 and the lower end of the shell 7, and within the shell 7 at the bottom thereof are projections 9 which form an inlet opening 10 and prevent liquid from surging into the bottom of the shell through the passages. A cleanout passage 11 has communication with the passages 8 at the bottom and a plug 12 is provided for normally closing this passage 11. At the upper end of the shell it is formed with apertures 13 through which liquid may pass from the upper chamber 2 to the inside of the shell 7, and supported by the shell at its top is a resistance coil designated generally by the reference numeral 14 having a plurality of spools 15 upon which are wound conductors connected in series forming a resistance 16 (see Fig. 2) to which at certain points are connected contact conductors 17 which extend downwardly from the resistance coil and are so arranged that the lower extremities form a series of contact points arranged in the form of a spiral and so graduated that when a liquid electrical conductor in the bottom of the shell 7 is raised it will make contact successively with the extremities of the conductors 17 thereby cutting off or short-circuiting portions of the resistance as the liquid rises. This coil 14 is preferably formed with an insulating piece 18 at the bottom which rests upon the upper end of the shell 7 and with an insulating piece 19 at the top in which is a contact terminal 20 (see Fig. 2). A cap 21 is provided for the casing 1 which makes a fluid-tight closure therefor and presses against the insulation 19 holding the coil firmly in place, the top and bottom insulation 18 and 19 serving also to hold the spools properly spaced from each other and in the chamber 2. The cap 21 is formed with a threaded opening 22 in which a plug 23 is secured, similar to a spark plug of a gas engine, and connected to this plug is a contact maker 24 which engages the contact 20 when the plug is in place.

To each of the pipes 4 and 5 is connected a four-way fitting 25. The pipes 4 and 5 are connected by means of a pipe connection 26 from their fittings 25 through an equalizer valve 27. The opposite end of each fitting is provided with a plug 28 by means of which access may be had to the interior of either pipe 4 or 5 separately for filling the pipe with liquid or for cleaning out the pipes. The equalizer valve 27 is normally closed but may be opened to admit liquid from one pipe to the other or for equalizing the pressure applied to the pipes 4 and 5.

Any suitable means may be employed for transmitting the pressure difference created by the flow of fluid in a conduit. In the present embodiment of this invention, a Pitot tube is shown as one satisfactory means for accomplishing the desired result. Connected to each of the pipes 4 and 5 through a valve 29 and a pipe connection 30 is a condensing vessel 31, the two vessels being preferably formed in an integral structure and each having a passage 32 communicating therewith adjacent the top. A plug member 33 (see Fig. 3) of a Pitot tube is connected by means of a threaded collar 34 to the vessels 31 and has a plurality of passages 35 therein which communicate with the openings 32 respectively. The opposite end of this plug member 33 has static and dynamic tubes 36 and 37 which are in communication with the passages 35 and both of the tubes are provided with perforations 38 spaced apart predetermined distances and arranged in line so that they can be placed in directly opposite positions with respect to the flow of fluid in the pipes, as shown more clearly in Fig. 5. This plug member of the Pitot tube is secured to a pipe 39 in which the flow of fluid is to be measured in any suitable manner as by means of a plug 40 threaded in the pipe and held in place on the plug member 33 by means of a gland 41, a collar 42 secured to the plug member and suitable packing material 43.

When measuring the flow of a condensable fluid, such as steam, the steam is condensed in the vessels 31 and fills the pipes 4 and 5 and a portion of each of the chambers 2 and 3, as indicated by the reference numeral 44. An electrical conducting fluid, such as mercury, is disposed in the bottom of the lower chamber 3 (designated by the reference numeral 45) so as to partially fill the chamber and to extend upwardly within the shell 7 to make an electrical connection with the contact wires 17. Between the mercury and the water in the chamber 2 an insulating liquid must be employed otherwise the action of the resistance on the spools 15 will be impaired and for that reason an insulating liquid, such as mineral oil, is placed in the chamber 2 and fills the shell 7 above the electrical conducting fluid 45. Thus it is seen that the pressure in the dynamic tube 37 of the Pitot tube is communicated through the pipe 5 to the mercury in the well or chamber 3 and the mercury is caused to rise within the shell 7 to make contact successively with the several depending electrical conductors 17. It will be obvious that the casing 1 may be located adjacent the pipe 39 in which the flow is to be measured, or it may be located at a distance therefrom and supported upon any suitable base or support 47.

In order to indicate the instantaneous flow and the volume of fluid passing through the pipe electrically, an indicating meter 48, a graphic recording meter 49 and an integrating watt meter 50 may be provided. The indicating and recording meters are in the nature of an indicating and recording ammeter and the other meter is in the nature of the ordinary electrical watt meter. These meters are connected to a proper resistance 51 and a conductor 52 with the plug 23 and thus through the resistance 16 to ground on casing 1 and are connected through a transformer winding 53 which furnishes the source of electrical supply at the proper voltage to ground indicated by the reference numeral 54. The reference numeral 55 designates the primary winding of a transformer through which power is given to the meters which in turn receives its power from the source of supply controlled by the switch 56. It is obvious that these meters, the specific construction of which is not concerned in the present invention, may be so made as to indicate and record the instantaneous flow or volume passing through the pipe 39 according to the following theory:

When a pressure difference balanced by a liquid column in a U-tube is made to indicate the velocity or volume of a fluid passing through a given conduit, the relation between the quantities is expressed in the following equation:

$$V = K(H)^{\frac{1}{2}} \ldots (1)$$

in which V represents the units of volume passing through the conduit in a given unit of time; $(H)^{\frac{1}{2}}$ is the square root of the height of the liquid column balancing the pressure difference, and K is a numerical constant determined experimentally for each given set of conditions including also the relation of sizes and densities.

From this equation it follows that to make an electric current proportional to the volume of fluid passing through the conduit it is only necessary that the same current should be proportional to the square root of the height of the liquid column balancing the velocity pressure, or pressure difference created by the flow.

The principle utilized to obtain this proportionality is a variation of Ohm's law from which it follows that when a number of electrical conductors are attached to a continuous resistance at various distances from the positive end of the resistance, the amount of current that will pass through the conductors forming a closed circuit of an electro-motive force will depend only upon the least resistance which is left between the nearest conductor in contact and the positive end of the resistance coil.

The resistance coil is made up of a series of spools terminating in a plurality of conductors overhanging a mercury column in the low pressure side of the U-tube to which the differential pressure of the flow is transmitted from the main conduit. The spools are connected together forming a continuous resistance, and the conductors forming the contact points are attached to the spools at the necessary resistance intervals which will be shown subsequently. The contacts are made to terminate in the form of a helix, each contact being uniformly shorter than the other in close succession. An electro-motive force of a positive constant voltage is interposed between the positive end of the resistance coil and the mercury column which also forms a part of the ground, and when the mercury column touches the contact point of a conductor it allows a given amount of current to pass through the circuit, this current for the positive voltage depending only upon the resistance left between the contact point and the electro-motive force of the circuit. The succession of the contact from one conductor to another corresponds to the rise or fall of the mercury column due to the variation in pressure difference caused by the change in the flow of the fluid creating the pressure difference. The resistance of the coil is so divided between the conductors forming the contacts that the current flowing through the circuit is proportional to the square root of the height between the highest and the lowest conductors that come in contact with the mercury column, which height represents the pressure difference, since the lowest conductor barely touches the mercury column when it is at zero or no flow level.

The resistance in ohms to be inserted between the positive end of the electro-motive force and each conductor in the set, is determined by the application of Ohm's law as follows:

Let H be the pressure difference in inches of mercury when a given conductor comes in contact. From the relation shown above—

$$V = K(H)^{\frac{1}{2}}$$

Let I be the current in amperes passing through the circuit at the pressure difference H, then in order that I should be proportional to V, it is necessary to make I proportional to $K(H)^{\frac{1}{2}}$ or $$I = K_1(H)^{\frac{1}{2}}$$

in which $K_1$ is another constant which bears a definite relation to K. (Any quantity proportional to a variable is also proportional to a constant times this variable.)

Now, let E be the electro-motive force measured in volts; R the resistance measured in ohms, then from Ohm's law $$E = IR,$$

or $$R = \frac{E}{I},$$

and since $$I = K_1 H^{\frac{1}{2}},$$

therefore $$R = \frac{E}{K_1 H^{\frac{1}{2}}}$$

For instance, assuming an available electro-motive force of 110 volts, and it is desired to pass one ampere of current at a height of one inch differential pressure, that is making $K_1$ equal to unity, then for $H = 1$, $$R = \frac{110}{1} = 110 \text{ ohms};$$

for $H = \frac{1}{2}$, $$R = \frac{110}{\left(\frac{1}{2}\right)^{\frac{1}{2}}} = 156 \text{ ohms},$$

and so on, having the total resistance in ohms from the positive end to each one of the conductors in the set equal to the electro-motive force divided by the square root of the vertical distance between the contact end of this conductor and the zero position of the mercury in the U-tube, which has to be elevated by the differential pressure in order to effect the contact of the conductor.

It will be noticed that without this special arrangement of resistances it is absolutely impossible to make the total amount of electrical energy as integrated by a watt meter to represent the volume of flow in the fluid conduit. That is, all devices that are made to indicate variable heights of a liquid column either by make and break of a circuit or by a continuous circuit in proportion to the height of the column, could not be applied to integrate the quantity of a flow, because the integrating device would accumulate the instantaneous heights of the column and not the square roots of the instantaneous heights which are necessary to represent the true flow of the fluid in the pipe.

It is obvious that this arrangement does away with all laborious calculations in equating various volumes of flow to the corresponding heights. It also does away with the uneven division of scales on the indicating dials of the instruments necessitated by the square root proportionality of the flow to the height of the balancing column. In this device it is only necessary to determine the amount of flow for a single value of the current, from which the constant ratio of one to the other is determined for all possible values.

When this device is employed for measuring a condensable vapor, it is necessary to prevent the water of condensation from coming in contact with the conductors and the resistance coil. It was found by actual experimenting that the presence of water would make the instrument inoperative by short-circuiting the contacts and also by deteriorating the insulation of the conductors. For this purpose the compartment of the instrument containing the conductors and the resistance coil is filled with an insulating oil so as to form a seal against the water of condensation. It was found that the coil had to be placed inside the seal, as no stuffing box material could be found that would eliminate leaks if the conductors were carried through insulated openings in the casing to the outside. With the resistance coil inside, the current is transmitted through a spark plug at the top of the instrument.

What I claim is:

1. A flow meter having a plurality of resistances with contacts therefor spaced apart and the resistances connected in series, the resistance of the coil thus formed being proportional to the square root of the distance between the first and last contacts, and means to make electrical connection with the contacts in succession.

2. In a flow meter, the combination with a resistance having a plurality of contacts connected thereto at intermediate points with the extremities of the contacts arranged in the form of a spiral, and means to make electrical connection with said contacts in succession, the resistance between the contacts being so proportioned that the current flowing through the resistance from a constant potential source of power is proportional to the square root of the height between the first and last contacts.

3. In a flow meter, the combination with a resistance having a plurality of contact points arranged intermediate the ends thereof and in succession, the resistance in ohms from one end of the resistance to each one of the contacts being equal to the impressed electro-motive force divided by the square root of the vertical distance of the contact from a predetermined zero position, and means controlled by the flow of the fluid to be measured for making electrical connection with the various contacts.

4. In a flow meter, the combination with a casing having an upper chamber and a lower chamber, a shell extending between and into the two chambers, means for transmitting differential pressure due to the flow comprising static and dynamic tubes connected separately with the said chambers respectively, a resistance coil comprising separate resistances with contacts depending therefrom within the said shell, the lower extremities of which are arranged in the form of a spiral, electrical measuring instruments connected to the coil and receiving current from a conducting fluid disposed in said well to engage the lowermost ends of the contacts in succession in accordance with the differential pressure between said tubes.

5. A flow meter comprising a casing with two chambers therein, means extending into and connecting the chambers forming a well between and in each of them, electrical indicating and recording mechanism comprising a plurality of contacts arranged in the form of an ascending spiral in said well, an electric conducting liquid in the well, means for varying the height of the electrical conducting liquid in the well by differential pressure in the said chambers due to the flow, and a valve in each tubular connection.

6. A continuous flow meter comprising a casing with two chambers therein, means connecting the chambers forming a well between and within each of them, electrical indicating and recording mechanism comprising a plurality of contacts arranged at different heights in said well and free from the wall thereof, an electric conducting liquid in the well, means for varying the height of the electrical conducting liquid in the well by differential pressure in the said chambers comprising a Pitot tube with separate static and dynamic tubes and their respective chambers, and an equalizing pipe between the said tubular connections and between the valves and the casing having a controlling valve therein.

7. In a flow meter, a casing having an upper chamber and a lower chamber, a sleeve secured to the casing and extending into both of the said chambers, a tubular connection with the bottom of the upper chamber and another tubular connection with the top of the lower chamber whereby a heavy electrical conducting liquid may be contained in the bottom of the lower chamber and in the bottom of the sleeve, and an insulating liquid may be contained in the top of the sleeve and the top of the upper chamber with a liquid lighter than the electrical conducting liquid and heavier than the insulating liquid at the top of the lower chamber and at the bottom of the upper chamber.

8. A flow meter comprising a casing with an upper chamber having an inlet at the bottom and a lower chamber having an inlet at the top, a shell secured to the casing between the said chambers forming communication and extending into each of said chambers, an electrical conducting liquid in the bottom of the lower chamber and of the shell, an insulating liquid at the top of the shell and in the upper chamber, and means for introducing another liquid under differential pressure to the said chambers for raising the height of the conducting liquid in the shell, and electrical apparatus having a resistance element disposed in the shell, the ohmic resistance of which is varied by the change in height of the electrical conducting liquid in the said shell.

9. In a flow meter, a casing formed with two chambers one directly above the other, a well formed by a shell extending between and into each of the said chambers, and a different liquid for each of the two chambers and the well.

10. In a flow meter, a casing having two chambers one above the other, a shell fitting tightly in the wall between the chambers and extending into both of them for separating the chambers directly from each other but forming a well communicating with each of the chambers at the top and bottom of the shell, different liquids in the chambers, and a different liquid in the well for separating the liquids in the chambers.

In testimony whereof I have signed my name to this specification, in the presence of two subscribing witnesses, on this 6th day of May, A. D. 1915.

JACOB M. SPITZGLASS.

Witnesses:
CHARLES H. SEEM,
KEUT W. WONNELL.